(12) United States Patent
Tsuji et al.

(10) Patent No.: US 6,644,684 B2
(45) Date of Patent: Nov. 11, 2003

(54) AIR BAG COVER FOR VEHICLES

(75) Inventors: Tatsumi Tsuji, Yokkaichi (JP); Motoko Itou, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/953,249

(22) Filed: Sep. 14, 2001

(65) Prior Publication Data

US 2002/0147281 A1 Oct. 10, 2002

Related U.S. Application Data

(63) Continuation-in-part of application No. 09/714,807, filed on Nov. 16, 2000, now abandoned.

(30) Foreign Application Priority Data

Nov. 18, 1999 (JP) ............................. 11-328498

(51) Int. Cl.$^7$ ........................ B60R 21/00; B60R 21/20
(52) U.S. Cl. ...................... 280/727; 280/728.3; 525/88; 525/240
(58) Field of Search ............................ 525/88, 89, 240; 280/727, 728.3

(56) References Cited

U.S. PATENT DOCUMENTS 6,357,788 B2 * 3/2002 Kreile

FOREIGN PATENT DOCUMENTS

| EP | 0774489 A1 | 5/1997 |
|----|------------|--------|
| EP | 0879853 A1 | 11/1998 |
| EP | 0985705 A1 | 3/2000 |
| JP | 10081797 | 3/1998 |
| JP | 10-265628 | 10/1998 |
| JP | 11-236483 | 8/1999 |
| JP | 11-278190 | 10/1999 |
| JP | 2000-212382 | 8/2000 |

* cited by examiner

*Primary Examiner*—Jeffrey Mullis
(74) *Attorney, Agent, or Firm*—David G. Conlin; John B. Alexander; Edwards & Angell, LLP

(57) ABSTRACT

There is disclosed a hinge type air bag cover for vehicles, produced by molding a thermoplastic elastomer composition comprising:

(A) 55 to 80 parts by weight of an olefin-based resin; and
(B) 20 to 45 parts by weight of a copolymer rubber of ethylene and an α-olefin having not less than 6 carbon atoms, the total content of said olefin-based resin (A) and sand copolymer rubber (B) being 100 parts by weight, said composition having a melt flow rate of not less than 5 g/10 minutes according to JIS K6758 at 230° C. under load of 21.17N, a flexural modulus of from not less than 550 MPa and less than 800 MPa, and a ratio of tensile break strength to flexural modulus of 0.03:1 to 0.07:1.

10 Claims, No Drawings

AIR BAG COVER FOR VEHICLES

CROSS REFERENCE TO RELATED U.S. APPLICATION

This application is a continuation-in-part of U.S. Ser. No. 09/714,807 filed Nov. 16, 2000 now abandoned.

BACKGROUND OF THE INVENTION

The present invention relates to an air bag cover for vehicles, and more particularly, to a cover for accommodating an air bag which is mounted in high-speed vehicles such as automobiles for protecting drivers and passenger(s) from collision accidents by inflation and deployment of the air bag in response to impact or deformation detected thereupon.

Air bag systems are adapted for protecting drivers and passengers) in vehicles from collision accidents, and include a sensor for detecting impact caused upon the collision and an air bag device.

The air bag device comprises an air bag, an air bag actuator, and a cover for accommodating these members, and is mounted in steering wheel, instrument panel, in front of an assistant seat, front pillar, side pillar, rear pillar, side of seat or the like.

When the vehicle receives,a large impact due to collision or the like, the air bag accommodated in an air bag casing is inflated, forces the cover to open from inside, and is deployed out into a vehicle compartment.

As the air bag covers used for air bag devices having such a structure, there are known those produced from foamed urethane with a metal core member, or those produced from foamed urethane with a hard plastic core member made of a polymer alloy composed of modified polyphenylene oxide axed 6-nylon as well as an inserted reinforcing member made of 6-nylon net or the like for the purpose of weight reduction.

However, in the case where the polymer alloy of modified polyphenylene oxide and 6-nylon is used as the core member, although the weight reduction is achieved, there is a tendency that the air bag is deteriorated in deployment property when used under a low temperature condition. Further, since the air bag cover of such a type has the net-like reinforcing member inserted therein, a number of complicated steps are required for the production thereof.

In order to solve these problems, in Japanese Patent Application Laid-Open (KOKAI) Nos. 1-202550 (1989), 2-171362 (1990), 2-220946 (1990) and 3-189252 (1991), there have been proposed two-color injection-molded air bag covers composed of a surface layer made of a soft thermoplastic elastomer and a core layer made of a hard thermoplastic elastomer having a good shape retention property, which are produced at a high yield by simplifying the above conventional production process of the air bag covers made of foamed urethane. Also, in Japanese Patent Application Laid-Open (KOKAI) Nos. 2,171364(1990), 4-151348(1992), 4-314648(1992) and 5-38996(1,993), there have been proposed single-layer injection-molded air bag covers which are produced at a reduced cost as compared to the above two-color injection-molded air bag cover.

According to these proposed methods, it is possible to produce air bag covers using ordinary injection-molding machines, and shorten a molding cycle thereof.

However, since latest models of air bag devices for protecting a passenger(s) of vehicles tend to be mounted in openings on an instrument panel located in front of assistant seat, front or side pillar, etc., air bag covers thereof have been required to have a less difference in rigidity and appearance from adjacent members.

The above two-color injection-molded air bag covers ox single-layer injection-molded air bag covers are provided with thin-wall portions (tear lines) to facilitate opening thereof upon deployment of the air bag, resulting in a less rigidity as well as unsatisfactory heat-deformation resistance.

In general, the above-described air bag is mounted within a steering wheel, and called a "tear-open" type air bag. More specifically, the air bag of this type is capable of inflating upon its operation so as to tear-open a cover portion thereof along tear seams or lines formed thereon, thereby allowing the air bag to be deployed into an occupant compartment of a vehicle. The air bag must be surely operated with a high safety. Therefore, it is necessary that the air bag cover is readily tear-opened along the tear seams or lines thereof. To achieve this requirement, the air bag cover is required to have a flexural modulus of not more than 500 MPa and a tensile strength of not more than 20 MPa.

On the other hand, in addition to the above-described tear-open type air bag cover mounted within a steering wheel, there is also known such an air bag which is accommodated within a pillar of the vehicle, and inflated along a side window upon its operation so as to cover the window in a curtain-like manner, thereby protecting occupants against impact force applied from a lateral direction of the vehicle. The air bag of this type is called a "non-tear-open" type or a "hinge" type, and have such a structure that when the air bag is inflated upon its operation, an air bag cover thereof is displaced or slightly deformed to form a clearance between the air bag cover and the pillar through which the air bag can be deployed into the occupant compartment. Thus, since the hinge-type air bag cover is not tear-opened, fitting portions of the air bag cover to which a load is applied during the operation, are required to have an appropriate strength. Therefore, the values of physical properties required for the hinge-type air bag cover are considerably different from those for the tear-open type air bag cover mounted on steering wheel of the vehicle. Also, the hinge-type air bag cover is free from flying fragmentation thereof upon the operation and, therefore, has advantages such as a less damage to occupants due to such fragmentations.

In addition, the hinge-type air bag cover fitted to the pillar will be frequently touched by a driver. Therefore, the air bag cover is required to have an appropriate strength without unstable feeling so as not to cause cave-in or depression upon touching.

In order to satisfy the above conflicting requirements at the same time, the hinge-type air bag cover is required to exhibit a flexural modulus of 550 to 800 MPa and a ratio of tensile break strength to flexural modulus of 0.03 to 0.07.

In Japanese Patent Application Laid-Open (KOKAI) No. 11-236483 (1999), there has been proposed the air bag cover (hinge-type) including a cover body, a fitting member securing the cover body to a stationary portion of vehicle, and a hinge member disposed near the fitting member. These members are arranged so as to be aligned with each other in the same plane. The air bag cover exhibits a good rigidity. However, since the air bag cover of such a type is molded from low-flowability resins in order to increase the strength of the hinge member, the molding of those having a complicated or elongated shape should be carried out at a high temperature, resulting in prolonged molding cycle and, therefore, deteriorated productivity. Further, the air bag cover tends to suffer from defects such as flow marks or the like, resulting in poor appearance.

As a result of the present inventors' earnest studies for solving the above problems, it has been found that when a thermoplastic elastomer composition containing specific components in specific amounts is used for the production of an air bag cover for vehicles, the obtained air bag cover can exhibit not only excellent rigidity and heat-deformation resistance without insertion of reinforcing members made of 6-nylon net or the like, but also high hinge strength and high fitting strength, and in addition, it has been found that the air bag cover can be fitted to or engaged with instrument panel or vehicle body directly or via other members such as metal inserts, is excellent in moldability and appearance, and can be operated with a high safety since it is free from breakage and flying-out into pieces upon deployment of the air bag. The present invention has been attained on the basis of the findings.

SUMMARY OF THE INVENTION

It is an object of the present invention to provide an air bag cover for vehicles in the form of a single-layer injection-molded product which exhibits not only excellent rigidity and heat-deformation resistance, but also has a high safety since it can be opened without breakage and flying-out into pieces upon deployment of the air bag.

Another object of the present invention is to provide a hinge-type air bag cover having a flexural modulus of 550 to 800 MPa and a ratio of tensile break strength to flexural modulus of 0.03 to 0.07 which can be produced at a high productivility and can show an excellent appearance.

To accomplish the aim, in a first aspect of the present invention, there is provided a hinge type air bag cover for vehicles, produced by molding a thermoplastic elastomer composition comprising:

(A) 55 to 80 parts by weight of an olefin-based resin; and
(B) 20 to 45 parts by weight of a copolymer rubber of ethylene arid an a-olefin having not less than 6 carbon atoms,
the total content of said olefin-based resin (A) and said copolymer rubber (B) being 100 parts by weight, said composition having a melt flow rate of not less than 5 g/10 minutes according to JIS X6758 at 230° C. under load of 21.17N, a flexural modulus of from not less than 550 MPa and less than 800 MPa, and a ratio of tensile break strength to flexural modulus of 0.03:1 to 0.07:1.

In a second aspect of the present invention, there is provided a hinge type air bag cover according to claim 1, wherein said thermoplastic elastomer composition further comprises (C) 1 to 20 parts by weight of a copolymer of ethylene and an α-olefin having not more than 4 carbon atoms, based on 100 parts by weight of the sum of said components (A) and (B), the copolymer (C) having a density of not more than 0.87 g/cm³.

In a third aspect of the present invention, there is provided a hinge type air bag cover according to claim 1, wherein said thermoplastic elastomer composition further comprises (D) 1 to 20 parts by weight of a styrene-based elastomer based on 100 parts by weight of the sum of said components (A) and (B).

DETAILED DESCRIPTION OF THE INVENTION

The present invention will be described in detail below.

Composition of Air Bag Cover for Vehicles (1) Components of Composition.

The components of a thermoplastic elastomer composition for the air bag cover according to the present invention are the following components (A) and (B):

Component (A): Olefin-based Resin

As the olefin-based resins used in the present invention, there may be exemplified homopolymers of α-olefins having about 2 to 8 carbon atoms such as ethylene, propylene and 1-butene; or copolymers of these α-olefins with other α-olefins having about 2 to 20 carbon atoms such as ethylene, propylene, 1-butene, 3-methyl-1-butene, 1-pentene, 4-methyl-1-pentene, 1-hexene, 1-octene and 1-decene or vinyl compounds such as vinyl acetate, acrylic acid, methacrylic acid, acrylic acid esters, methacrylic acid esters, styrene and vinyl chloride. Specific examples of the olefin-based resins may include ethylene-based resins such as ethylene homopolymers, e.g., low-, medium- ox high-density polyethylene, ethylene-propylene copolymer, ethylene-X-butane copolymer, ethylene-4-methyl-1-pentane copolymer, ethylene-1-hexane copolymer, ethylene-1-octane copolymer, ethylene-vinyl acetate copolymer, ethylene-acrylic acid copolymer, ethylene-methacrylic acid copolymer, ethylene-methyl methacrylate copolymer and ethylene-ethyl acrylate copolymer; propylene-based resins such as propylene homopolymer, propylene-ethylene copolymer and propylene-ethylene-1-butene copolymer; or 1-butane-based resins such as 1-butane homopolymer, 1-butane-ethylene copolymer, 1-butene-propylene copolymer.

Of these olefin-based resins, the propylene-based resins are preferred, and propylene-ethylene block copolymers axe more preferred.

The olefin-based resins used in the present invention may have an ethylene content of preferably 1 to 10% by weight, more preferably 2 to 8% by weight; a melt flow rate of preferably 10 to 100 g/10 minutes, more preferably 15 to 80 g/10 minutes when measured at 230° C. under a load of 21.17N according to JIS K6758; and a ratio of weight-average molecular weight (Mw) to number-average molecular weight (Mn) of preferably 5:1 to 10:1.

When the ethylene content of the olefin-based resins is out of the above specified range, the obtained composition may tend to be deteriorated in flexural modulus and heat-deformation resistance.

When the melt flow rate of the olefin-based resins is less than 10 g/10 minutes, the obtained composition may tend to be deteriorated in moldability and appearance. On the contrary, when the melt flow rate of the olefin-based resins is more than 100 g/10 minutes, the tensile break strength (measured using a dumbbell No. 2 according to JIS K7113) and Izod impact strength (measured at −30° C. according to JIS K7110) of the obtained composition may tend to be deteriorated.

When the ratio of weight-average molecular weight (Mw) to number-average molecular weight (DM) is less than 5:1, the injection-molded product may tend to suffer from flow marks. On the contrary, when the ratio is more than 10:1, the flexural modulus and tensile break strength of the obtained composition may tend to be deteriorated.

Component (B): Copolymer Rubber of Ethylene and α-olefin Having Not Less Than 6 Carbon Atoms:

As the copolymer rubbers (B) of ethylene and an α-olefin having not less than 6 carbon atoms, there may be suitably used those produced by continuously copolymerizing ethylene with the α-olefin having 6 to 12 carbon atoms in the coexistence of hydrogen using a catalyst composed of a soluble vanadium compound and an organoaluminum compound or a Kaminsky catalyst.

Examples of the α-olefins having not less than 6 carbon atoms used in the copolymer rubbers (B) may include 1-hexane, 4-methyl-1-pentene, 1-octene, 1-decene or the like. Among these α-olefins, 1-hexene and 1-octene are preferred.

The copolymer rubber (B) of ethylene and an a-olefin having not less than 6 carbon atoms, has a melt flow rate of preferably not more than 10 g10 minutes, more preferably not more than 5 g/10 minutes when measured at 230° C. under a load of 21.17N according to JTS X6758; and a density of preferably not more than 0.88 g/cm$^3$, more preferably not more than 0.875 g/cm$^3$ when measured according to JIS K7112.

When the melt flow rate of the copolymer rubber (B) is more than 10 g/10 minutes, the composition composed of the components (A) and (B) may tend to exhibit a poor tensile break strength (measured using a dumbbell No. 2 according to JIS K7113), so that the obtained air bag cover sometimes adversely affects the deployment performance of air bag upon operation of the air bag device.

When the density of the copolymer rubber (B) is more than 0.88 g/cm$^3$, the composition composed of the components (A) and (B) may tend to exhibit a poor Izod impact strength (measured at −30° C. according to JIS K7110).

(2) Additional Components

The thermoplastic elastomer composition for the air bag cover of the present invention may further contain the following components according to requirements.

Component (C): Copolymer of Ethylene and an α-olefin Having Not More Than 4 Carbon Atoms:

The component (C) may be blended in the composition of the air bag cover in order to control a low-temperature Izod impact property and a flexural modulus of the thermoplastic elastomer composition.

As the copolymer of ethylene and an α-olefin having not more than 4 carbon atoms as the component (C), there may be used copolymer rubbers of ethylene and α-olefin having not more than 4 carbon atoms, or copolymers of ethylene, at olefin having not more than 4 carbon atoms and conjugated diene.

Examples of the α-olefins having not more than 4 carbon atoms used in the component (C) may include propylene, 1-butene or the like.

Example of the conjugated dienes used in the component (C) may include 5-ethylidene norbornene, 5-methyl norbornene, 5-vinyl norbornene, dicyclopentadiene or the like.

Specific examples of the components (C) may include ethylene-propylene copolymer, ethylene-butane copolymer, ethylene-propylene-conjugated diene copolymer or the like.

The copolymer of ethylene and an α-olefin having not more than 4 carbon atoms as the component (C) has a density of preferably not more than 0.87 g/cm$^3$ when measured according to JIS K7112.

When the density of the copolymer (C) is more than 0.87 g/cm$^3$, the obtained composition may tend to fail to show an enhanced low-temperature Izod impact property.

Component (D): Styrene-based Elastomer

The component (D) may be blended in the composition of the air bag cover in order to enhance a low-temperature Izod impact strength and tensile break strength of the thermoplastic elastomer composition, and scuff- or mar-resistance of the product produced therefrom.

As the styrene-based elastomer as the component (D), there may be used copolymers of an aromatic vinyl compound and a conjugated dimer, copolymers of ethylene and an aromatic vinyl compound or the like.

Examples of the preferred styrene-based elastomers may include (i) hydrogenated products of aromatic vinyl-conjugated diene block copolymer rubbers composed of at least two polymer blocks containing aromatic vinyl compounds and at least one polymer block containing conjugated diene; (ii) hydrogenated products of block copolymer rubbers composed of at least one polymer block containing aromatic vinyl compound and at least one polymer block containing conjugated diene or aromatic vinyl compound-conjugated diene compound random copolymer block; or (iii) hydrogenated products of block copolymer rubbers composed of at least one polymer block containing aromatic vinyl compound, aromatic vinyl compound-conjugated diene compound random copolymer block and aromatic vinyl compound-conjugated diene compound tapered copolymer block which is gradually increased in content of the aromatic vinyl compound moieties. Of these styrene-based elastomers, more preferred are the hydrogenated products of aromatic vinyl-conjugated diene block copolymer rubbers composed of at least two polymer blocks containing aromatic vinyl compounds and at least one polymer block containing conjugated diene.

The hydrogenated products of aromatic vinyl-conjugated diene block copolymer rubbers contain styrene blocks in an amount of usually 20 to 40 parts by weight, preferably 25 to 35 parts by weight.

As the conjugated dienes used in the above hydrogenated products, there may be exemplified butadiene, isoprene or a mixture thereof. Specific examples of the styrene-based elastomers may include styrene-butadiene block copolymer (hereinafter referred to merely as "S-B-S"), styrene-isoprene block copolymer (hereinafter referred to merely as "S-I-S"), styrene-butadiene-isoprene block copolymer (hereinafter referred to merely as "S-BI-S"), styrene-ethylene-butadiene-styrene block copolymer (hereinafter referred to merely as "S-E-B-S") corresponding to hydrogenated styrene-butadiene block copolymer (hereinafter referred to merely as "hydrogenated S-B-S"), or the like.

(3) Other Optional Components:

In addition to the above components, the composition of the air bag cover of the present invention may optionally contain the following other components according to requirements unless the addition of these optional components significantly damages the effects of the present invention. Examples of the other optional components may include various additives such as colorants, antioxidants, thermal stabilizers, light stabilizers, ultraviolet light absorbers, various inorganic fillers, various thermoplastic elastomers other than those described above, neutralizing agents, lubricants, anti-fogging agents, anti-blocking agents, slipping agents, flame retardants, dispersing agents, antistatic agents, conductivity-imparting agents, metal deactivators, molecular weight-modifying agents, anti-bacterial agents and fluorescent brightening agents.

Especially, it is preferred to add the inorganic fillers to the composition of the air bag cover, and as the inorganic fillers, talc is more preferred from a point of view of the shape (scale shape). The amount of talc added is preferably 3 to 15 parts by weight based on 100 parts by weight of the sum of the components (A) and (B). The average particle size is preferably 1 to 6 μm from a point of view of the impact property.

(4) Blending Ratio:

As to the blending ratio between the respective components of the thermoplastic elastomer composition constituting the air bag cover according to the present invention, the content of the olefin-based resin as the component (A) is usually 55 to 80 parts by weight, preferably 55 to 75 parts by weight; and the content of the copolymer rubber of ethylene and α-olefin having not less than 6 carbon atoms as the component (B) is usually 20 to 45 parts by weight, preferably 25 to 45 parts by weight. When the contents of the respective components are out of the above specified ranges, there arise the following problems.

That is, when the content of the component (A) is less than 55 parts by weight, the obtained composition may be deteriorated in rigidity and heat-deformation resistance. When the content of the component (A) is more than 80 parts by weight, the obtained air bag cover may adversely affect the deployment property of the air bag when subjected to such a deployment test in which the air bag cover is mounted together with the other members of the air bag device onto the vehicle within 2 minutes after the molded air bag corer is cooled at −35° C. for not less than 30 minutes in a cooling vessel.

When the content of the component (B) is less than 20 parts by weight, the obtained air bag cover may be deteriorated in low-temperature deployment property. When the content of the component (B) is more than 45 parts by weight, the obtained composition may be deteriorated in rigidity and heat-deformation resistance.

The contents of the component (C) and/or the component (D) optionally added to the composition are respectively usually 1 to 20 parts by weight, preferably 3 to 18 parts by weight based on 100 parts by weight of the sum of the components (A) and (B).

When the content of the component (C) is more than 20 parts by weight, the obtained composition may tend to be not only deteriorated in rigidity and heat-deformation resistance, but also lowered in tensile break strength, thereby causing deterioration in high-temperature deployment property of the air bag.

When the content of the component (D) is more than 20 parts by weight, the obtained composition may tend to be deteriorated in not only rigidity and heat-deformation resistance but also moldability, resulting in poor appearance of the molded product.

(5) Production of Thermoplastic Elastomer Composition:

The thermoplastic elastomer composition of the present invention can be produced by uniformly mixing the respective components together using Henschel mixer, ribbon blender, V-type blender, screw blender or the like, and then kneading the resultant mixture by ordinary methods using ordinary extruder, banbury mixer, rolls, Brabender mixer, kneader or the like. Among these apparatuses, the use of extruder, especially twin-screw extruder, is preferred. Upon the mixing or kneading, the thermoplastic elastomer composition may be partially cross-linked by adding a cross-linking agent or an auxiliary cross-linking agent thereto and then dynamically heat-treating the composition.

The degree of cross-linking of the composition is preferably about 10 to 40 parts. The degree of cross-linking of the composition is determined by the following method. That is, 100 g of a sample is immersed in xylene maintained at 144° C. and extracted for 20 hours to measure the weight of extraction residues. The degree of cross-linking of the composition is expressed by the percentage of the weight of the extraction residues based on the weight of the initial sample.

As the suitable cross-linking agents for partially cross-linking the composition, there may be used organic peroxides such as 2,5-dimethyl-2,5-di (tert-butylperoxy) hexane, 2,5-dimethyl-2,5-di (tert-butylperoxy)-3-hexyne, 1,3-bis (tert-butylperoxyisopropyl) benzene, 1,1-di (tert-butylpexoxy)-3,5, 5-trimethylcyclohexane, 2,5-dimethyl-2, 5-di (benzoylperoxy)-3-hexyne, dicumyl peroxide or the like.

The amount of the cross-linking agent added is about 0.01 to 1 part by weight.

As the suitable auxiliary cross-linking agents used together with the above organic peroxide as the cross-linking agent for partially cross-linking the composition, there may be exemplified functional compounds such as N, N'-m-phenylene bismaleimide, toluylene bismaleimide, p-quinone dioxime, nitrobenzene, diphenyl guanidine, trimethylol propane, divinyl benzene, ethylene glycol dimethacrylate, polyethylene glycol methacrylate, trimethylol propane trimethacrylate, allyl methacrylate or the like.

The amount of the auxiliary cross-linking agent added is about 0.01 to 1 part by weight.

(6) Properties of Thermoplastic Elastomer Composition:

The thermoplastic elastomer composition used as a raw material of the air bag cover for vehicles according to the present invention, has a melt flow rate of not less than 5 g/10 minutes when measured at 230° C. under a load of 21.17N according to JIS K6758; a flexural modulus of from not less than 550 MPa and less than 800 MPa, preferably 600 to 800 MPa when measured according to JIS K7203; a ratio of a tensile break strength (measured using a dumbbell No. 2 according to JIS K7113) to a flexural modulus of 0.03:1 to 0.07:1, preferably 0.03:1 to 0.06:1; and a −30° C. Izod impact strength of preferably not less than 25 KJ/m², more preferably not less than 30 KJ/m² when measured according to JIS K7110.

When the melt flow rate of the composition used is less than 5 g/10 minutes, the air bag cover may tend to be produced with a low yield, and suffer from defects such as flow marks and short shots, resulting in poor appearance thereof.

When the flexural modulus of the composition used is less than 550 MPa, the obtained air hag cover may tend to be deteriorated in rigidity and heat-deformation resistance. On the contrary, when the flexural modulus of the composition used is not less than 800 MPa, the Izod impact strength of the obtained air bag cover may tend to be deteriorated.

Further, when the ratio of tensile break strength to flexural modulus of the composition is less than 0.03, the strength against stress concentrated to hinged portions or fitting portions due to deformation upon deployment of the air bag may become lowered, so that defects-such as cracks and breakage may tend to be caused, resulting in poor deployment performance of the air bag. on the other hand, when the ratio of tensile break strength to flexural modulus of the composition is more than 0.07, the tensile break elongation of the obtained air bag cover may tend to be deteriorated, so that the relaxation of stress concentrated to hinged portions or fitting portions may be difficult to occur upon deployment of the air bag. As a result, since cracks or breakage are readily generated on the air bag cover, the deployment property of the air bag may tend to be deteriorated.

Further, when the Izod impact strength of the composition is less than 25 KJ/m², the breaking energy permissible level at fitting portions or hinged portions which tend to suffer from stress concentration upon the low-temperature air bag deployment test, is lowered, so that breakage is readily caused at such portions, resulting in poor low-temperature deployment property of the air bag.

Molding of Air Bag Cover

The air bag cover for vehicles according to the present invention can be produced by various molding methods, usually by injection-molding method. Also, if required, there may be used a gas injection-molding method, an injection compression-molding method, a short shot expansion-molding method or the like. When the air bag cover is injection-molded, the molding conditions may include a molding resin temperature of usually 100 to 300° C., preferably 150 to 280° C; an injection pressure of usually 5 to 100 MPa, preferably 10 to 80 MPa; and a mold temperature of usually 20 to 80° C., preferably 20 to 50° C.

The air bag cover for vehicles of the present invention may be in the form of a single-layer injection-molded product. Alternatively, the air bag cover may have a multi-layer structure further including a surface layer and, if required, a foamed synthetic resin layer, or may be of such a structure obtained by bonding a vacuum-molded composite sheet constituted by a surface layer made of soft polyvinyl chloride or olefin-based thermoplastic elastomer and a foamed polyolefin-based resin layer, onto the single-layer injection-molded product.

The thus obtained air bag cover for vehicles is adapted for accommodating an air bag of an air bag device or system for vehicles, which is inflated and deployed by sensing the impact or deformation caused upon collision accidents of high-speed vehicles such as automobiles.

In particular, the air bag cover of the present invention can be suitably mounted onto relatively narrow portions such as front pillar, side pillar and rear pillar of the vehicles, and is allowed to surely open without breakage upon actuation of the air bag device.

In accordance with the present invention, there can be obtained an air bag cover for vehicles, which are free from breakage and flying-out into pieces upon inflation of the air bag, have excellent rigidity and heat-deformation resistance., and can be mounted inside an instrument panel or onto at relatively narrow portions such as front pillar and side pillar. Therefore, the air bag cover of the present invention is useful as a cover for an air bag device which is inflated and deployed by sensing the impact or deformation caused upon collision accidents of automobiles or the like.

EXAMPLES

The air bag cover for vehicles according to the present invention will be described in detail with reference to the following examples.

Raw Materials

In Examples and Comparative Examples, the following materials were used.

TABLE 1

| Olefin-based resin | Kind | Component (A) Melt flow rate (g/10 min. at 230° C.) | Ethylene content (parts) | Mw/Mn |
|---|---|---|---|---|
| a-1 | Propylene-ethylene block copolymer | 30 | 9.0 | 7.3 |

TABLE 1-continued

| Olefin-based resin | Kind | Component (A) Melt flow rate (g/10 min. at 230° C.) | Ethylene content (parts) | Mw/Mn |
|---|---|---|---|---|
| a-2 | Propylene-ethylene block copolymer | 2 | 5.0 | 5.9 |
| a-3 | Propylene-ethylene block copolymer | 30 | 14.0 | 5.8 |
| a-4 | Propylene-ethylene block copolymer | 60 | 5.0 | 4.7 |

TABLE 2

| Copolymer rubber of ethylene and α-olefin with 6 or more carbon atoms | Kind | Component (B) Melt flow rate (g/10 min. at 230° C.) | Density (g/cm$^3$) |
|---|---|---|---|
| b-1 | Ethylene-octene copolymer rubber | 2.3 | 0.87 |
| b-2 | Ethylene-hexene copolymer rubber | 1.0 | 0.87 |
| b-3 | Ethylene-octene copolymer rubber | 12 | 0.87 |
| b-4 | Ethylene-octene copolymer rubber | 2.3 | 0.89 |

TABLE 3

| Copolymer rubber of ethylene and α-olefin with 4 or less carbon atoms | Kind | Component (C) Melt flow rate (g/10 min. at 230° C.) | Density (g/cm$^3$) |
|---|---|---|---|
| c-1 | Ethylene-propylene copolymer rubber | 0.7 | 0.86 |
| c-2 | Ethylene-butene copolymer rubber | 2.1 | 0.86 |
| c-3 | Ethylene-butene copolymer rubber | 1.0 | 0.89 |

TABLE 4

| Styrene-based elastomer | Kind | Component (D) Melt flow rate (g/10 min. at 230° C.) | Styrene content (parts) |
|---|---|---|---|
| d-1 | Styrene-butadiene block copolymer rubber | 1> | 29 |
| d-2 | Styrene-isoprene block copolymer rubber | 1> | 30 |

Evaluation Method

In Examples and Comparative Examples, various properties and characteristics were evaluated by the following methods.

Meanwhile, in the following evaluation methods (2) to (5), the respective samples to be measured were test pieces injection-molded at an injection pressure of 50 MPa, an injection temperature of 220° C. and a mold temperature of 40° C. using an in-line screw-type injection-molding machine N100B (manufactured by Nippon Seikosho Co., Ltd.).

Also, as the sample to be measured in the evaluation method (6), there was used a model product of an air bag for vehicles which was injection-molded at 220° C. using an in-line screw-type injection-molding machine IS220 (manufactured by Toshiba Kikai Co., Ltd.).

(1) Melt Flow Rate (g/10 Minutes):

The melt flow rate (g/10 minutes) was measured at 230° C. under a load of 21.17N according to JIS K6758.

(2) Flexural Modulus (MPa):

The flexural modulus (MPa) was measured at a bending speed of 2 mm/minute by setting the span (distance between supports) to 64 mm according to 31S K7203.

(3) Tensile Break Strength (MPa):

The tensile break strength (MPa) was measured at a pulling speed of 50 mm/minute by using a JIS dumbbell No. 2 stamped from a sheet having a size of 120 mm in length ×80 mm in width ×2 mm in thickness, according to JIS K7113.

(4) Izod Impact Strength (KJ/$m^2$):

The Izod impact strength (KIT/m2) was measured at −30° C. using a notched test piece according to JIS K7110.

(5) Heat-deformation Resistance:

The heat-deformation resistance was measured by retaining a test piece (width: 10 mm) for flexural modulus evaluation by using a bending creep test jig according to JIS K7116 such that the width direction thereof was in parallel with the direction of applied load. A load of 2.2 MPa was applied to the test piece at 110° C. to measure an amount of deformation thereof. The test pieces having a deformation amount of not more than 4 mm were evaluated as those having a good heat-deformation resistance.

(6) Moldability:

The moldability was examined as to a model air bag cover for vehicles molded at a temperature of 220° C. The air bag covers exhibiting short shots were evaluated to be defective.

(7) Appearance:

The appearance was examined as to a molded model air bag cover for vehicles. The air bag covers suffering from considerable amounts of sinks and flow marks were evaluated to be defective.

(8) Air Bag Deployment Test:

As a test specimen for an air bag deployment test, there was used an air bag corer which was injection-molded at a temperature of 220° C. using an in-line screw-type injection-molding machine "NN350" manufactured by Niigata Tekkosho Co., Ltd.

The air bag cover was allowed to stand in a constant temperature oven maintained at each deployment test temperature (−40° C. and 80° C.) for one hour, and then subjected to the deployment test. The test specimens showing any of the following defects were determined to be unacceptable, while those capable of normally deploying without any of these defects were determined to be acceptable.

1. Cover was broken, into fragmentations and flown or scattered around;
2. Cover was broken into sharp-edged pieces;
3. Cover was fractured and separated at fitting portions thereof;
4. Cover was elongated at fitting portions thereof and considerably deformed.

Examples 1 to 13 and Comparative Examples 1 to 5

Raw materials shown in Tables 1 to 4 were blended together in amounts (part by weight) shown in Tables 5 to 8 to obtain a thermoplastic elastomer composition.

0.1 part by weight of a phenol-based antioxidant (tradename: "IRUGANOX 1010") was added to 100 parts by weight of the thus obtained composition, and then the resultant mixture was melt-kneaded at 200° C. by a twin-screw extruder (L/D: 33; cylinder diameter: 45 mm; manufactured by Ikegai Kekko Co., Ltd.) and then extruded into pellets.

Meanwhile, in Example 10, the same procedure as defined above was conducted except that 0.1 part by weight of 2,5-dimethyl-2,5-di(tert-butylperoxy) hexane or 2,5-dimethyl-2,5-di (tert-butylperoxy)-3-hexyne as a cross-linking agent (tradename: "KAYAHEXA AD", produced by Kayaku Akzo Co., Ltd.) and 0.2 part by weight of trimethylolpropane trimethacrylate as an auxiliary cross-linking agent (tradename: "ACRYLESTER TMP", produced by Mitsubishi Rayon Co., Ltd.) were further added to the composition, thereby obtaining pellets.

The thus obtained pellets were injection-molded, and the obtained injection-molded products were evaluated by the above-described evaluation methods. The results are shown in Tables 5 to 8.

TABLE 5

| Component and evaluation | Examples | | | | |
|---|---|---|---|---|---|
| | 1 | 2 | 3 | 4 | 5 |
| Composition | | | | | |
| Component (A) [parts by weight] | | | | | |
| a-1 | 55 | 65 | 75 | 65 | 65 |
| a-2 | — | — | — | — | — |
| a-3 | — | — | — | — | — |
| a-4 | — | — | — | — | — |
| Component (B) [parts by weight] | | | | | |
| b-1 | 45 | 35 | 25 | — | 35 |
| b-2 | — | — | — | 35 | — |
| b-3 | — | — | — | — | — |
| b-4 | — | — | — | — | — |
| Component (C) [parts by weight] | | | | | |
| c-1 | — | — | — | — | 10 |
| c-2 | — | — | — | — | — |
| c-3 | — | — | — | — | — |
| Component (D) [parts by weight] | | | | | |
| d-1 | — | — | — | — | — |
| d-2 | — | — | — | — | — |
| Evaluation of properties | | | | | |
| Melt flow rate (g/10 min.) | 9 | 13 | 16 | 9 | 11 |
| Flexural modulus (MPa) | 580 | 690 | 780 | 580 | 550 |
| Tensile break strength (MPa) | 30 | 35 | 33 | 38 | 25 |
| −30° C. Izod impact strength (KJ/$m^2$) | Not broken | Not broken | 40 | Not broken | Not broken |

TABLE 5-continued

| Component and evaluation | Examples | | | | |
|---|---|---|---|---|---|
| | 1 | 2 | 3 | 4 | 5 |
| Heat-deformation resistance (mm) | Good (3.5) | Good (2.8) | Good (2.1) | Good (3.3) | Good (3.4) |
| Moldability | Good | Good | Good | Good | Good |
| Appearance of product | Good | Good | Good | Good | Good |
| Ratio of tensile break strength to flexural modulus | 0.052 | 0.051 | 0.042 | 0.066 | 0.045 |
| Air bag deployment test (−40° C.)[1] | ○ | ○ | ○ | ○ | ○ |
| Air bag deployment test (80° C.)[1] | ○ | ○ | ○ | ○ | ○ |

[1] ○: acceptable, X: unacceptable

TABLE 6

| Component and evaluation | Examples | | | | |
|---|---|---|---|---|---|
| | 6 | 7 | 8 | 9 | 10 |
| Composition | | | | | |
| Component (A) [parts by weight] | | | | | |
| a-1 | 65 | 65 | 65 | 65 | 65 |
| a-2 | — | — | — | — | — |
| a-3 | — | — | — | — | — |
| a-4 | — | — | — | — | — |
| Component (B) [parts by weight] | | | | | |
| b-1 | 35 | 35 | 35 | 35 | 35 |
| b-2 | — | — | — | — | — |
| b-3 | — | — | — | — | — |
| b-4 | — | — | — | — | — |
| Component (C) [parts by weight] | | | | | |
| c-1 | — | — | — | — | — |
| c-2 | 10 | — | — | 10 | — |
| c-3 | — | — | — | — | — |
| Component (D) [parts by weight] | | | | | |
| d-1 | — | 10 | — | 10 | — |
| d-2 | — | — | 10 | — | — |
| Evaluation of properties | | | | | |
| Melt flow rate (g/10 min.) | 12 | 8 | 7 | 7 | 8 |
| Flexural modulus (MPa) | 590 | 590 | 580 | 560 | 650 |
| Tensile break strength (MPa) | 29 | 29 | 28 | 27 | 40 |
| −30° C. Izod impact strength (KJ/m$^2$) | Not broken | Not broken | Not broken | Not broken | Not broken |
| Heat-deformation resistance (mm) | Good (3.2) | Good (3.1) | Good (3.2) | Good (3.8) | Good (2.7) |
| Moldability | Good | Good | Good | Good | Good |
| Appearance of product | Good | Good | Good | Good | Good |
| Ratio of tensile break strength to flexural modulus | 0.049 | 0.049 | 0.048 | 0.048 | 0.06 |
| Air bag deployment test (−40° C.)[1] | ○ | ○ | ○ | ○ | ○ |
| Air bag deployment test (80° C.)[1] | ○ | ○ | ○ | ○ | ○ |

[1] ○: acceptable, X: unacceptable

TABLE 7

| Component and evaluation | Examples | | |
|---|---|---|---|
| | 11 | 12 | 13 |
| Composition | | | |
| Component (A) [parts by weight] | | | |
| a-1 | 80 | 65 | — |
| a-2 | — | — | — |
| a-3 | — | — | — |
| a-4 | — | — | 65 |
| Component (B) [parts by weight] | | | |
| b-1 | 20 | 35 | 35 |
| b-2 | — | — | — |
| b-3 | — | — | — |
| b-4 | — | — | — |
| Component (C) [parts by weight] | | | |
| c-1 | — | — | — |
| c-2 | — | — | — |
| c-3 | 10 | 10 | — |
| Component (D) [parts by weight] | | | |
| d-1 | — | — | — |
| d-2 | — | — | — |
| Evaluation of properties | | | |
| Melt flow rate (g/10 min.) | 18 | 13 | 17 |
| Flexural modulus (MPa) | 880 | 630 | 650 |
| Tensile break strength (MPa) | 36 | 33 | 35 |
| −30° C. Izod impact strength (KJ/m$^2$) | 16 | 20 | 18 |
| Heat-deformation resistance (mm) | Good (1.8) | Good (2.9) | Good (2.7) |
| Moldability | Good | Good | Good |
| Appearance of product | Good | Good | Not good |
| Ratio of tensile break strength to flexural modulus | 0.044 | 0.052 | 0.054 |
| Air bag deployment test (−40° C.)[1] | ○ | ○ | ○ |
| Air bag deployment test (80° C.)[1] | ○ | ○ | ○ |

[1] ○: acceptable, X: unacceptable

TABLE 8

| Component and evaluation | Comparative Examples | | | | |
|---|---|---|---|---|---|
| | 1 | 2 | 3 | 4 | 5 |
| Composition | | | | | |
| Component (A) [parts by weight] | | | | | |
| a-1 | 50 | — | — | 65 | 65 |
| a-2 | — | 65 | — | — | — |
| a-3 | — | — | 65 | — | — |
| a-4 | — | — | — | — | — |
| Component (B) [parts by weight] | | | | | |
| b-1 | 50 | 35 | 35 | — | — |
| b-2 | — | — | — | — | — |
| b-3 | — | — | — | 35 | — |
| b-4 | — | — | — | — | 35 |
| Component (C) [parts by weight] | | | | | |
| c-1 | — | — | — | — | — |
| c-2 | — | — | — | — | — |
| c-3 | — | — | — | — | — |

TABLE 8-continued

| Component and evaluation | Comparative Examples | | | | |
|---|---|---|---|---|---|
| | 1 | 2 | 3 | 4 | 5 |
| Component (D) [parts by weight] | | | | | |
| d-1 | — | — | — | — | — |
| d-2 | — | — | — | — | — |
| Evaluation of properties | | | | | |
| Melt flow rate (g/10 min.) | 7 | 1 | 12 | 17 | 13 |
| Flexural modulus (MPa) | 460 | 690 | 590 | 690 | 730 |
| Tensile break strength (MPa) | 27 | 36 | 14 | 19 | 30 |
| −30° C. Izod impact strength (KJ/m²) | Not broken | Not broken | Not broken | 25 | 15 |
| Heat-deformation resistance (mm) | Not good (4.9) | Good (2.6) | Good (3.3) | Good (2.6) | Good (2.3) |
| Moldability | Good | Not good | Good | Good | Good |
| Appearance of product | Good | Not good | Good | Good | Good |
| Ratio of tensile break strength to flexural modulus | 0.058 | 0.052 | 0.023 | 0.027 | 0.041 |
| Air bag deployment test (−40° C.)[1] | ○ | ○ | X | X | X |
| Air bag deployment test (80° C.)[1] | ○ | ○ | X | ○ | ○ |

[1]○: acceptable, X: unacceptable

Examples 14 to 34

The same procedure as defied in Examples 1 to 13 was conducted except that each inorganic filler shown in Table 9 was added to a composition of each Example Shown in Table 9 in an amount shown in Table 9. The obtained injection-molded products were evaluated by the above-described evaluation method. The results are shown in Table 9.

Meanwhile, the properties of talc used are set forth below.

Specific surface area (cm²/g): 38,000
Average particle size (μm): 2.8

TABLE 9

| Component and evaluation | Examples | | | | | |
|---|---|---|---|---|---|---|
| | 14 | 15 | 16 | 17 | 18 | 19 |
| Composition | | | | | | |
| Example No. of Objective Composition [100 parts by weight] | 1 | 1 | 2 | 2 | 4 | 4 |
| Inorganic filler [parts by weight] | | | | | | |
| Talc | 5 | 10 | 5 | 10 | 5 | 10 |
| Evaluation of properties | | | | | | |
| Melt flow rate (g/10 min.) | 9 | 10 | 13 | 11 | 9.5 | 10 |
| Flexural modulus (MPa) | 730 | 770 | 795 | 880 | 740 | 880 |
| Tensile break strength (MPa) | 24 | 26 | 25 | 27 | 28 | 31 |
| −30° C. Izod impact strength (KJ/m²) | Not broken | Not broken | Not broken | 35 | Not broken | 28 |
| Heat-deformation resistance (mm) | Good (2.3) | Good (2.2) | Good (1.9) | Good (1.8) | Good (2.3) | Good (1.8) |
| Moldability | Good | Good | Good | Good | Good | Good |
| Appearance of product | Good | Good | Good | Good | Good | Good |
| Ratio of tensile break strength to flexural modulus | 0.032 | 0.033 | 0.031 | 0.031 | 0.038 | 0.035 |
| Air bag deployment test (−40° C.)[1] | ○ | ○ | ○ | ○ | ○ | ○ |
| Air bag deployment test (80° C.)[1] | ○ | ○ | ○ | ○ | ○ | ○ |

TABLE 9-continued

| Component and evaluation | Examples | | | | | |
|---|---|---|---|---|---|---|
| | 20 | 21 | 22 | 23 | 24 | 25 |
| Composition | | | | | | |
| Example No. of Objective Composition [100 parts by weight] | 5 | 5 | 6 | 6 | 7 | 7 |
| Inorganic filler [parts by weight] | | | | | | |
| Talc | 5 | 10 | 5 | 10 | 5 | 10 |
| Evaluation of properties | | | | | | |
| Melt flow rate (g/10 min.) | 7 | 10 | 8 | 11 | 7 | 10 |
| Flexural modulus (MPa) | 650 | 770 | 660 | 780 | 600 | 740 |
| Tensile break strength (MPa) | 22 | 24 | 25 | 26 | 27 | 25 |
| −30° C. Izod impact strength (KJ/m$^2$) | Not broken | Not broken | Not broken | Not broken | Not broken | Not broken |
| Heat-deformation resistance (mm) | Good (2.7) | Good (2.2) | Good (2.6) | Good (2.1) | Good (3.0) | Good (2.3) |
| Moldability | Good | Good | Good | Good | Good | Good |
| Appearance of product | Good | Good | Good | Good | Good | Good |
| Ratio of tensile break strength to flexural modulus | 0.033 | 0.031 | 0.038 | 0.033 | 0.045 | 0.034 |
| Air bag deployment test (−40° C.)[1)] | ◯ | ◯ | ◯ | ◯ | ◯ | ◯ |
| Air bag deployment test (80° C.)[1)] | ◯ | ◯ | ◯ | ◯ | ◯ | ◯ |

| Component and evaluation | Examples | | | | | |
|---|---|---|---|---|---|---|
| | 26 | 27 | 28 | 29 | 30 | 31 |
| Composition | | | | | | |
| Example No. of Objective Composition [100 parts by weight] | 8 | 8 | 9 | 9 | 10 | 10 |
| Inorganic filler [parts by weight] | | | | | | |
| Talc | 5 | 10 | 5 | 10 | 5 | 10 |
| Evaluation of properties | | | | | | |
| Melt flow rate (g/10 min.) | 6 | 9 | 5.5 | 5 | 5 | 6 |
| Flexural modulus (MPa) | 610 | 750 | 600 | 720 | 710 | 750 |
| Tensile break strength (MPa) | 28 | 26 | 26 | 24 | 29 | 31 |
| −30° C. Izod impact strength (KJ/m$^2$) | Not broken | Not broken | Not broken | Not broken | Not broken | Not broken |
| Heat-deformation resistance (mm) | Good (3.1) | Good (2.2) | Good (3.0) | Good (2.4) | Good (2.4) | Good (2.2) |
| Moldability | Good | Good | Good | Good | Good | Good |
| Appearance of product | Good | Good | Good | Good | Good | Good |
| Ratio of tensile break strength to flexural modulus | 0.045 | 0.035 | 0.043 | 0.033 | 0.041 | 0.041 |
| Air bag deployment test (−40° C.)[1)] | ◯ | ◯ | ◯ | ◯ | ◯ | ◯ |
| Air bag deployment test (80° C.)[1)] | ◯ | ◯ | ◯ | ◯ | ◯ | ◯ |

TABLE 9-continued

| Component and evaluation | Examples | | |
|---|---|---|---|
| | 32 | 33 | 34 |
| Composition | | | |
| Example No. of Objective Composition [100 parts by weight] | 15 | 15 | 16 |
| Inorganic filler [parts by weight] | | | |
| Talc | 5 | 10 | 5 |
| Evaluation of properties | | | |
| Melt flow rate (g/10 min.) | 8 | 11 | 17 |
| Flexural modulus (MPa) | 680 | 800 | 830 |
| Tensile break strength (MPa) | 27 | 29 | 28 |
| −30° C. Izod impact strength (KJ/m$^2$) | Not broken | 45 | 25 |
| Heat-deformation resistance (mm) | Good (2.6) | Good (1.8) | Good (1.8) |
| Moldability | Good | Good | Good |
| Appearance of product | Good | Good | Good |
| Ratio of tensile break strength to flexural modulus | 0.040 | 0.036 | 0.034 |
| Air bag deployment test (−40° C.)[1] | ◯ | ◯ | ◯ |
| Air bag deployment test (80° C.)[1] | ◯ | ◯ | ◯ |

[1]◯: acceptable, X: unacceptable

What is claimed is:

1. A non-tearing air bag cover for vehicles, produced by molding a thermoplastic elastomer compositions comprising:

(A) 55 to 80 parts by weight of an olefin-based resin;

(B) 20 to 45 parts by weight of a copolymer rubber of ethylene and an α-olefin having not less than 6 carbon atoms, the total content of said olefin-based resin (A) and said copolymer rubber (B) being 100 parts by weight, said composition having a melt flow rate of not less than 5 g/10 minutes according to JIS K6758 at 230° C. under load of 21.17N a flexural modulus of from not less than 550 MPa and less than 800 MPa, and a ratio of tensile break strength to flexural modulus of 0.03:1 to 0.07:1.

2. A non-tearing air bag cover according to claim 1, wherein the flexural modulus of said composition has 600 MPa to 800 MPa.

3. A non-tearing air bag cover according to claim 1, wherein the ratio of tensile break strength to flexural modulus has 0.03:1 to 0.06:1.

4. A non-tearing air bag cover according to claim 1, wherein said thermoplastic elastomer composition has an Izod impact strength of not less than 25 KJ/m$^2$.

5. A non-tearing air bag cover according to claim 1, wherein said thermoplastic customer composition has an Izod impact strength of not less than 30 KJ/m$^2$.

6. A non-tearing air bag cover according to claim 1, wherein said thermoplastic elastome composition comprises:

(A) 55 to 75 parts by weight of the olefin-based resin; and (B) 25 to 45 parts by weight of the copolymer rubber of ethylene and an α-olefin having not less than 6 carbon atoms.

7. A non-tearing air bag cover according to claim 1, wherein said component (A) is a propylene-ethylene block copolymer having a melt flow rate of 10 to 100 g/10 minutes, an ethylene content of not more than 10% by weight and a ratio of weight-averaged molecular weight (Mw) to number-averaged molecular weight (Mn) of 5:1 to 10:1; and said component (B) is a copolymer of ethylene and an α-olefin having not less than 6 carbon atoms, the component (B) having a melt flow rate of not more than 10 g/ 10 minutes and a density of not more than 0.88 g/cm$^3$.

8. A non-tearing air bag cover according to claim 1, wherein said thermoplastic elastomer composition further comprises (C) 1 to 20 parts by weight of a copolymer of ethylene and an α-olefin having not more than 4 carbon atoms, based on 200 parts by weight of the sum of said components (A) and (B), the copolymer (C) having a density of not more than 0.87 g/cm$^3$.

9. A non-tearing air bag cover according to claim 1, wherein said thermoplastic elastomer composition further comprises (D) 1 to 20 parts by weight of a styrene-based elastomer based on 100 parts by weight of the sum of said components (A) and (B).

10. A non-tearing air bag cover according to claim 9, wherein said styrene-based elastomer (D) is a hydrogenated product of aromatic vinyl-conjugated diene block copolymer rubber.

* * * * *